US012595153B2

(12) United States Patent
Hsu et al.

(10) Patent No.: US 12,595,153 B2
(45) Date of Patent: Apr. 7, 2026

(54) ELEVATOR CAR IDENTIFICATION AND TRACKING

(71) Applicant: OTIS ELEVATOR COMPANY, Farmington, CT (US)

(72) Inventors: Arthur Hsu, South Glastonbury, CT (US); Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1552 days.

(21) Appl. No.: 17/092,224

(22) Filed: Nov. 7, 2020

(65) Prior Publication Data

US 2022/0144585 A1 May 12, 2022

(51) Int. Cl.
*B66B 1/34* (2006.01)
*B66B 9/00* (2006.01)
*G06V 10/22* (2022.01)
*H04W 4/029* (2018.01)
*H04W 4/40* (2018.01)

(52) U.S. Cl.
CPC .......... *B66B 1/3492* (2013.01); *B66B 1/3461* (2013.01); *B66B 9/003* (2013.01); *G06V 10/225* (2022.01); *H04W 4/029* (2018.02); *H04W 4/40* (2018.02)

(58) Field of Classification Search
CPC ..... B66B 1/3492; B66B 1/3461; B66B 9/003; B66B 5/0087; B66B 9/00; B66B 3/02; B66B 1/2466; B66B 1/2491; B66B 2201/307; G06V 10/225; H04W 4/029; H04W 4/40
See application file for complete search history.

(56) References Cited

U.S. PATENT DOCUMENTS

| | | | | |
|---|---|---|---|---|
| 2006/0065491 A1* | 3/2006 | Zaharia | ..................... | B66B 1/18 |
| | | | | 187/391 |
| 2010/0175953 A1* | 7/2010 | Kostka | ...................... | B66B 3/02 |
| | | | | 187/394 |
| 2012/0193169 A1* | 8/2012 | Mizon | ................... | B66B 1/3492 |
| | | | | 187/394 |
| 2021/0107766 A1* | 4/2021 | Thum | ................... | B66B 5/0018 |

FOREIGN PATENT DOCUMENTS

WO        2018177828 A1    10/2018

OTHER PUBLICATIONS

Extended European Search Report for Application No. EP 21 20 5900 dated Mar. 14, 2022.

* cited by examiner

*Primary Examiner* — Bickey Dhakal
(74) *Attorney, Agent, or Firm* — Carlson, Gaskey & Olds, P.C.

(57) ABSTRACT

An illustrative example embodiment of an elevator system includes a plurality of elevator cars, a plurality of car identifiers, a plurality of location identifiers, and a controller. Each of the car identifiers is associated with one of the elevator cars and provides a unique identification to the associated elevator car. Each of the location identifiers is configured to be situated in a selected location of the elevator system and provides a unique identification to the selected location. The controller determines a location of each of the elevator cars based on at least one indication of the associated car identifier being at the location of a corresponding one of the location identifiers.

21 Claims, 2 Drawing Sheets

ELEVATOR CAR IDENTIFICATION AND TRACKING

BACKGROUND

Elevator systems are in widespread use for carrying passengers between various levels in buildings, for example. Traditional elevator systems include an elevator car supported within a hoistway to provide service to passengers at the landings along the hoistway. In most elevator systems, the elevator car remains in the hoistway throughout its service life.

Other elevator system configurations have been proposed. For example, it has been proposed to include more than one elevator car within a hoistway and move the cars independently of each other. Other elevator systems have been proposed that include the ability to move an elevator car from one hoistway into another hoistway. Such systems present new challenges. For example, keeping track of more than one elevator car within a hoistway or the location of an elevator car that can be transitioned between different hoistways was not a concern in traditional elevator systems where a single car remains in a single hoistway.

SUMMARY

An illustrative example embodiment of an elevator system includes a plurality of elevator cars, a plurality of car identifiers, a plurality of location identifiers, and a controller. Each of the car identifiers is associated with one of the elevator cars and provides a unique identification to the associated elevator car. Each of the location identifiers is configured to be situated in a selected location of the elevator system and provides a unique identification to the selected location. The controller determines a location of each of the elevator cars based on at least one indication of the associated car identifier being at the location of a corresponding one of the location identifiers.

In addition to one or more of the features described above, or as an alternative, each location identifier is configured to obtain information from a nearby one of the car identifiers when the one of the car identifiers is within a predetermined range of the location identifier, each location identifier is configured to provide the indication to the controller, the indication includes an indication of the unique identification of the elevator car associated with the nearby one of the car identifiers and the indication includes an indication of the unique identification of the selected location.

In addition to one or more of the features described above, or as an alternative, each car identifier comprises a visible marking on the associated one of the elevator cars and each location identifier comprises an optical device that is configured to detect the visible marking of each car identifier.

In addition to one or more of the features described above, or as an alternative, the optical device comprises at least one of a reader, a camera, or a scanner and the visible marking comprises at least one of an image, a character, a bar code, a QR code, a color, or a pattern.

In addition to one or more of the features described above, or as an alternative, each car identifier comprises a signaling device that transmits a signal including an indication of the unique identification of the associated one of the elevator cars. Each location identifier comprises at least a receiver configured to receive the signal of the car identifiers when one of the car identifiers is within a predetermined range of the location identifier.

In addition to one or more of the features described above, or as an alternative, each car identifier and each location identifier is configured for bi-directional communication of signals including indications of the corresponding unique identification.

In addition to one or more of the features described above, or as an alternative, each car identifier is configured to obtain information from a nearby one of the location identifiers when the nearby one of the location identifiers is within a predetermined range of the car identifier. Each car identifier is configured to provide the indication to the controller. The indication includes an indication of the unique identification of the associated one of the elevator cars and the indication includes an indication of the unique identification of the location of the nearby one of the location identifiers.

In addition to one or more of the features described above, or as an alternative, the car identifiers are each configured to obtain information from another one of the car identifiers when the one of the car identifiers is within a predetermined range.

In addition to one or more of the features described above, or as an alternative, the elevator system includes a plurality of hoistways and at least one transition zone between the hoistways and wherein the selected locations of the location identifiers correspond to a transition between one of the hoistways and the transition zone.

In addition to one or more of the features described above, or as an alternative, the elevator system includes at least one parking zone where any of the elevator cars may be at least temporarily parked and wherein the selected location of one of the location identifiers corresponds to the parking zone.

In addition to one or more of the features described above, or as an alternative, the car identifiers are each supported on one of the elevator cars for movement with the one of the elevator cars among different locations within the system.

In addition to one or more of the features described above, or as an alternative, the selected locations of the location identifiers are fixed positions along a hoistway in which the elevator cars can travel.

[owns] An illustrative example embodiment of a method of tracking a plurality of elevator cars in an elevator system includes a plurality of car identifiers that are each associated with one of the elevator cars such that each of the car identifiers provides a unique identification to the associated one of the elevator cars and a plurality of location identifiers that are each situated in a selected location of the elevator system such that each location identifier provides a unique identification to the selected location. The method includes indicating when one of the car identifiers is at the location of one of the location identifiers, the indication including an indication of the unique identification of the elevator car associated with the one of the car identifiers and determining a location of the elevator car having the unique identification of the received indication based on the received indication and information regarding the unique identification of the location of the one of the location identifiers.

In addition to one or more of the features described above, or as an alternative, the method includes obtaining, by one of the location identifiers, information from a nearby one of the car identifiers when the nearby one of the car identifiers is within a predetermined range of the location identifier. The indicating is performed by the one of the location identifiers. The indicating comprises providing an indication of the unique identification of the elevator car associated with the nearby one of the car identifiers and the indication includes an indication of the unique identification of the selected location.

In addition to one or more of the features described above, or as an alternative, each car identifier comprises a visible marking on the associated one of the elevator cars and each location identifier comprises an optical device that is configured to detect the visible marking of each car identifier.

In addition to one or more of the features described above, or as an alternative, the optical device comprises at least one of a reader, a camera, or a scanner. The visible marking comprises at least one of an image, a character, a bar code, a QR code, a color, or a pattern.

In addition to one or more of the features described above, or as an alternative, each car identifier comprises a signaling device that transmits a signal including an indication of the unique identification of the associated one of the elevator cars. Each location identifier comprises at least a receiver configured to receive the signal of the car identifiers when one of the car identifiers is within a predetermined range of the location identifier.

In addition to one or more of the features described above, or as an alternative, the method includes using bi-directional communication between at least one of the car identifiers and at least one of the location identifiers, the bi-direction communication including indications of the corresponding unique identifications.

In addition to one or more of the features described above, or as an alternative, the method includes obtaining, by one of the car identifiers, information from a nearby one of the location identifiers when the nearby one of the car identifiers is within a predetermined range of the location identifier. The indicating is performed by the one of the car identifiers. The indicating comprises providing an indication of the unique identification of the location of the nearby one of the location identifiers and the indication includes an indication of the unique identification of the elevator car associated with the one of the car identifiers.

In addition to one or more of the features described above, or as an alternative, the car identifiers are each configured to obtain information from another one of the car identifiers when the one of the car identifiers is within a predetermined range.

The various features and advantages of at least one disclosed example embodiment will become apparent to those skilled in the art from the following detailed description. The drawings that accompany the detailed description can be briefly described as follows.

DETAILED DESCRIPTION

Figure 1:
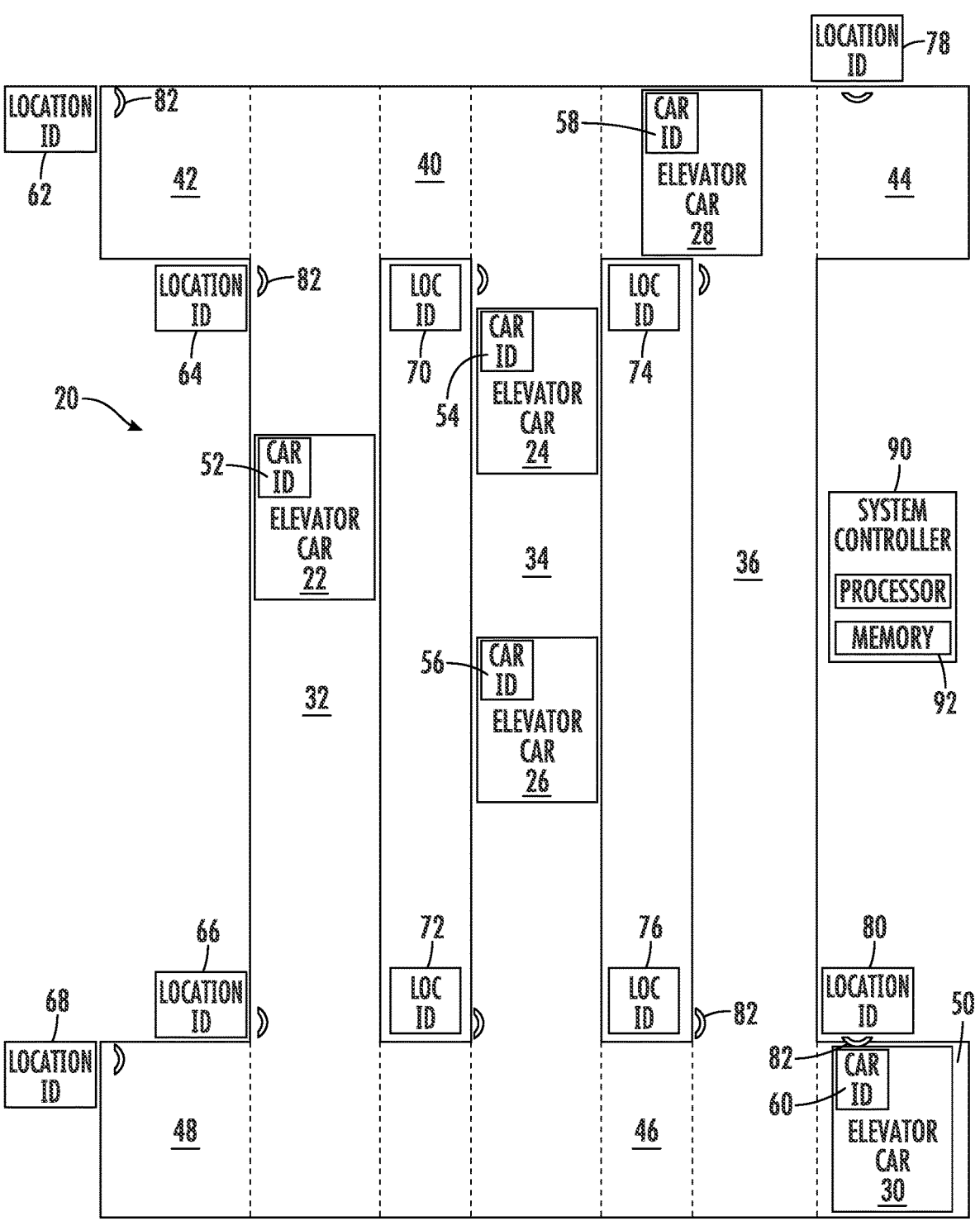
FIG. 1 schematically illustrates selected portions of an example embodiment of an elevator system.

FIG. 1 schematically illustrates selected features of an elevator system 20 that includes a plurality of elevator cars 22, 24, 26, 28 and 30. The illustrated example arrangement includes a plurality of hoistways 32, 34 and 36. Each of the hoistways 32-36 is configured to accommodate at least one of the elevator cars 22-30 at any given time. The elevator cars 22-30 are independently moveable along a selected one of the hoistways 32-36 to provide elevator service. The manner in which the elevator cars 22-30 are supported for movement within the hoistways 32-36 may vary depending on the particular embodiment.

The elevator system 20 includes a transition zone 40 that allows any of the elevator cars 22-30 to exit one of the hoistways 32-36 and transition into another of the hoistways 32-36. In the illustrated example embodiment, each end of the transition zone 40 includes a parking space 42, 44. An elevator car may be parked in a parking space during light traffic conditions when less than all of the cars are needed or for purposes of storing or performing maintenance on that elevator car. Another transition zone 46 is located near an opposite end of the hoistways 32-36. Parking spaces 48 and 50 are included at opposite ends of the transition zone 46. While transition zones 40, 46 are shown at the top and bottom of the hoistways 32, 34, 36, it should be understood that the transition zones 40, 46 and/or additional transition zones may be located at intermediate locations in the hoistways 32, 34, 36.

Since the elevator cars 22-30 are selectively moveable among and between the hoistways 32-36, the example elevator system 20 includes features that allow for identifying and tracking the elevator cars 22-30. In this example embodiment, a plurality of car identifiers are each associated with one of the elevator cars. Car identifiers 52, 54, 56, 58 and 60 are respectively associated with the elevator cars 22, 24, 26, 28 and 30. Each car identifier 52-60 provides a unique identification for the associated elevator car. While the car identifiers 52-60 are shown at the top left corner of each elevator cars 22-30, it should be understood that the car identifiers 52-60 may be located at any desired location on the elevator cars 22-30 and, in some embodiments, there may be multiple car identifiers 52-60 on some or all elevator cars 22-30.

In some embodiments, the unique identification of each elevator car facilitates assigning a particular car to selected types of calls. For example, one of the elevator cars 22-30 may be configured for VIP or special needs passengers. The unique identification of such a car allows for dispatching that car to particular calls where such a car would be useful or required.

A plurality of location identifiers are situated at selected locations within the elevator system 20. Each of the location identifiers provides a unique identification to the selected location where that location identifier is situated. A location identifier 62 is situated to interact with a car identifier when an associated elevator car is situated in the parking space 42. Another location identifier 64 is situated to interact with a car identifier when an associated one of the elevator cars transitions between the hoistway 32 and the transition zone 40. Another location identifier 66 is situated in a location near an opposite end of the hoistway 32 and is positioned to interact with a car identifier of an associated one of the elevator cars that transitions between the hoistway 32 and the transition zone 46. A location identifier 68 is situated to interact with a car identifier of any of the elevator cars that is parked in the parking space 48.

Other location identifiers 70, 72, 74 and 76 are situated at the locations that an elevator car passes when transitioning between the hoistways 34 and 36 and the transition zones 40 and 46. The location identifiers 70, 72, 74 and 76 are situated to provide information when an elevator car moves into or out of a corresponding one of the hoistways 34 or 36. Another location identifier 78 is situated to interact with a car identifier of an associated one of the elevator cars parked in the parking space 44. A location identifier 80 is situated to interact with the car identifier 60 of the elevator car 30, which is parked in the parking space 50.

A system controller 90 determines the locations of the elevator cars 22-30 based on an indication of the associated car identifier being at the location of a corresponding one of the location identifiers. The system controller 90 receives the indication that a car identifier is at the location of a corresponding location identifier from either the involved location identifier or car identifier. The indication provides information regarding the location of the associated elevator car.

The system controller 90 uses such indications to determine the locations of the elevator cars 22-30 within the elevator system 20 at least for purposes of tracking whether an elevator car 22-30 is in one of the hoistways 32, 34 or 36, one of the transition zones 40 or 46, or in one of the parking spaces 42, 44, 48 or 50. The system controller 90 may determine more specific location information regarding the elevator cars 22-30, such as the landing at which an elevator car is currently situated or a vertical position within one of the hoistways 32-36, using other information that is outside the scope of this description.

For example, the location identifier 80 obtains information from the car identifier 60 when the car identifier 60 is within a pre-selected range schematically shown at 82 of the location identifier 80. When the car identifier 60 is within the range 82, that corresponds to the elevator car 30 being situated in the parking space 50.

The location identifier 80 communicates with the controller 90 to provide information to the controller 90 that allows the controller 90 to determine that the elevator car 30 is in the parking space 50. The information from the location identifier 80 includes at least an indication of the unique identification of the elevator car 30 from the car identifier 60. In some embodiments, the location identifier 80 will also provide an indication of its unique location. In some embodiments the controller 90 includes memory or a database that associates the unique location identification of each location identifier and is configured to recognize any communications from that location identifier as an indication of that location.

The determined location of an elevator car may be used by the controller 90 after the car has moved away from the location identifier that provided the most recent indication regarding the associated car identifier. The same indication can be considered valid until a subsequent indication corresponds to the elevator car moving into a different location, such as moving from one hoistway into another. For example, assuming that the elevator car 24 has recently entered the hoistway 34 from the transition zone 40, the location identifier 70 would have provided an indication to the controller 90 that the car identifier 54 was within the range 82 of the location identifier 70. The controller 90 uses that indication to determine that the elevator car 24, which has a unique identification based on the car identifier 54, has moved into the hoistway 34. Until one of the location identifiers 70 or 72 provides an indication that the elevator car 24 has moved into one of the transition zones 40 or 46, the controller 90 is aware that the elevator car 24 remains in the hoistway 34.

Any time one of the car identifiers 52-60 is situated within the range 82 of a location identifier 62-80, that location identifier communicates an indication of the unique car identification to the controller 90 so that the controller 90 is constantly aware of whether an elevator car is in one of the hoistways, a transition zone, or a parking space.

The manner in which location identifiers 62-80 obtain information from a nearby one of the car identifiers 52-60 may vary depending on the particular embodiment. In some example embodiments, each car identifier comprises a visible marking on the associated one of the elevator cars. Each location identifier in such an embodiment comprises an optical device that is configured to detect the visible marking of each car identifier and to provide an appropriate corresponding communication to the controller 90. In some examples, the optical device of the location identifiers 62-80 comprises at least one of a reader, a camera, a detector, or a scanner. The visible marking of the car identifiers 52-60 may comprise at least one of an image, a character, a barcode, a QR code, a color, or a pattern. The visible marking of the car identifier 52-60 uniquely identifies the associated elevator car to the controller 90 when the location identifier detects the visible marking and communicates that to the controller 90.

Other car identifiers include different detectable or readable media, such as a magnetic strip. The location identifiers in such embodiments include detectors or readers configured to obtain the car identification information from such media.

In some embodiments, the car identifiers 52-60 comprise a signaling device that transmits a signal including an indication of the unique identification of the associated elevator car. The transmitted signal may be a magnetic field, wireless data signal, light or sound, for example. Each location identifier 62-80 in such an embodiment comprises at least a receiver configured to receive the signal of the car identifiers when one of the car identifiers is within the predetermined range 82 of the location identifier. In such embodiments, the car identifiers may comprise, for example, light emitting diodes, RFID tags, beacons, Bluetooth transmitters, acoustic signature devices.

The location identifiers 62-80 receive information from the car identifiers 52-60 in embodiments like those described above. In other embodiments, the exchange of information is essentially in the opposite direction. In some example embodiments, the car identifiers 52-60 obtain information from a location identifier 62-80 when the associated elevator car passes by or is situated near the corresponding location identifier. In such embodiments, the car identifiers 52-60 communicate with the system controller 90 including an indication of the unique identification of the location of the location identifier from which the car identifier obtained the information. In such embodiments, the location identifiers may have one or more of the characteristics of the car identifiers described above and the car identifiers may have one or more of the characteristics of the location identifiers described above.

The direction of communication or the manner in which location and car identifier information is tracked may vary based on the capabilities of the identifier components and to meet the needs of a particular elevator system. In other embodiments, the car identifiers 52-60 and the location identifiers 62-80 communicate with the controller 90 to provide information regarding interactions between the car identifiers and the location identifiers.

In some example embodiments, each car identifier 52-60 and each location identifier 62-80 is configured for bi-directional communication of signals including indications of their corresponding unique identification.

Regardless of which type of identifier communicates with the controller 90, it is possible to track where each elevator car is within the elevator system 20 at a level of specificity pertaining to whether the elevator car is in a particular hoistway, transition zone, or parking area. The example embodiment includes memory 92 accessible by, associated with or part of the controller 90. The memory 92 includes a database of information regarding at least the locations of the elevator cars within the elevator system 20.

US 12,595,153 B2

7

8

Figure 2:
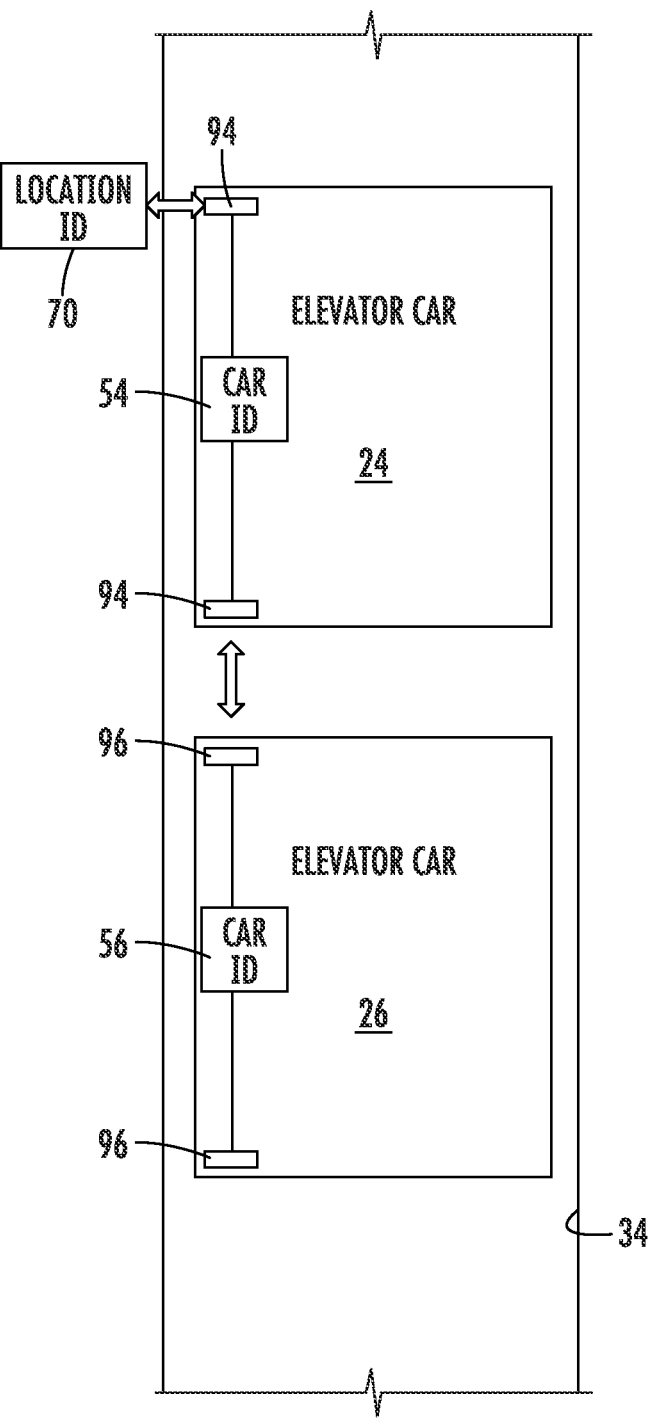
FIG. 2 diagrammatically illustrates selected features of elevator cars in an example embodiment.

FIG. 2 schematically illustrates an example embodiment in which the car identifiers 52-60 are configured to interact with the location identifiers 62-80 and with other car identifiers 52-60. Taking the elevator cars 24 and 26 within the hoistway 34, for example, the car identifiers 54 and 56 are capable of recognizing each other and communicating corresponding information to the controller 90. In this example, the car identifier 54 includes communication devices 94 situated near opposite ends of the elevator car 24. The car identifier 56 includes communication devices 96 near opposite ends of the elevator car 26. The locations of the car identifiers or associated communication devices on the respective elevator cars are not limited to the arrangements shown in the drawings. The communication devices 94 and 96 may incorporate or be any of the type of signaling, detecting or communication devices or media mentioned above.

In the arrangement shown in FIG. 2, one of the communication devices 94 of the car identifier 54 is close enough to the location identifier 70 for that position of the elevator car 24 to be communicated to the controller 90. The elevator car 26 is close enough to the elevator car 24 for the communication devices 94 and 96 to interact in a manner that the car identifiers 54 and 56 communicate with the controller 90 to provide an indication of the location of the elevator cars 24 and 26 relative to each other. The communication devices 94 and 96 are capable of communicating with each other at a variety of ranges or distances between the elevator cars to meet the needs of a particular implementation. This type of recognition of another elevator car facilitates the controller 90 determining that the elevator cars 24 and 26 are in an expected location relative to each other within the hoistway 34. Such inter-car interaction and identification enhances an ability of the controller 90 to identify any conditions in which an elevator car is in an unexpected or undesired location within the elevator system 20.

One feature of the disclosed example embodiments is that it is possible to determine and maintain information regarding the use of each elevator car 22-30. Such information may include a time of service, distance traveled, and average loading of the elevator car. This information is useful, for example, for scheduling routine maintenance of the elevator cars.

The information regarding each elevator car may be maintained in the memory 92 or another database associated with the controller 90. In some embodiments, each elevator car includes memory associated with its car identifier containing the use or operation information regarding that elevator car. The associated car identifier may periodically communicate such information to the controller 90. Depending on how often the controller 90 should be updated, the car identifiers may communicate with the controller 90 through any nearby location identifier or directly through a wireless communication protocol while the elevator car moves within a hoistway. In some embodiments, an authorized individual, such as a mechanic, can access the memory onboard the elevator car to obtain information regarding the use of that car for purposes of determining whether and what type of maintenance may be needed or to set a maintenance schedule.

The disclosed example embodiment provides information regarding location and use of each elevator car in a multiple car, multiple hoistway system. This allows for assigning particular cars to particular calls based on each car's location or unique features. With such embodiments, it is possible to identify and track each elevator car and to maintain a useful database of information regarding each car. For example, embodiments consistent with this description may include a car controller that has access to information regarding expected movement of a nearby car, which can be used to adjust planned movement of one or more cars to increase efficiency or satisfy system operation parameters.

There are variations mentioned above as alternative features of an embodiment. Such features are not exclusive of each other and various combinations of the disclosed features are possible in other embodiments.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An elevator system, comprising:
a plurality of elevator cars;
a plurality of hoistways that receive the plurality of elevator cars;
a plurality of car identifiers, each of the car identifiers being associated with one of the elevator cars and providing a unique identification to the associated one of the elevator cars;
a plurality of location identifiers, each of the location identifiers being configured to be situated in a selected location of the elevator system and providing a unique identification to the selected location;
a plurality of transition zones that accommodate elevator car movement between the plurality of hoistways, wherein at least one location identifier of the plurality of location identifiers is fixed at intersections between each of the plurality of transition zones and associated hoistways; and
a controller that determines a location of each of the elevator cars based on at least one indication of the associated car identifier being at the location of a corresponding one of the location identifiers.

2. The elevator system of claim 1, wherein
each location identifier is configured to obtain information from a nearby one of the car identifiers when the one of the car identifiers is within a predetermined range of the location identifier,
each location identifier is configured to provide the indication to the controller,
the indication includes an indication of the unique identification of the elevator car associated with the nearby one of the car identifiers, and
the indication includes an indication of the unique identification of the selected location.

3. The elevator system of claim 2, wherein
each car identifier comprises a visible marking on the associated one of the elevator cars, and
each location identifier comprises an optical device that is configured to detect the visible marking of each car identifier.

4. The elevator system of claim 3, wherein
the optical device comprises at least one of a reader, a camera, or a scanner; and
the visible marking comprises at least one of an image, a character, a bar code, a QR code, a color, or a pattern.

5. The elevator system of claim 2, wherein
each car identifier comprises a signaling device that transmits a signal including an indication of the unique identification of the associated one of the elevator cars, and each location identifier comprises at least a receiver configured to receive the signal of the car identifiers when one of the car identifiers is within a predetermined range of the location identifier.

6. The elevator system of claim 5, wherein each car identifier and each location identifier is configured for bi-directional communication of signals including indications of the corresponding unique identification.

7. The elevator system of claim 1, wherein each car identifier is configured to obtain information from a nearby one of the location identifiers when the nearby one of the location identifiers is within a predetermined range of the car identifier, each car identifier is configured to provide the indication to the controller, the indication includes an indication of the unique identification of the associated one of the elevator cars, and the indication includes an indication of the unique identification of the location of the nearby one of the location identifiers.

8. The elevator system of claim 7, wherein the car identifiers are each configured to obtain information from another one of the car identifiers when the one of the car identifiers is within a predetermined range.

9. The elevator system of claim 1, comprising at least one parking zone where any of the elevator cars may be at least temporarily parked and wherein the selected location of one of the location identifiers corresponds to the parking zone.

10. The elevator system of claim 1, wherein the car identifiers are each supported on one of the elevator cars for movement with the one of the elevator cars among different locations within the system.

11. The elevator system of claim 1, wherein selected locations of the location identifiers are fixed positions along the plurality of hoistways in which the plurality of elevator cars can travel.

12. The elevator system of claim 1, including one or more parking areas where one or more of the plurality of elevator cars may be at least temporarily parked, and wherein the system controller determines locations of each elevator car for purposes of tracking whether each elevator car is in one of the parking areas, in one of the plurality of hoistways, or in one of the plurality of transition zones.

13. A method of tracking a plurality of elevator cars in an elevator system that includes a plurality of car identifiers that are each associated with one of the elevator cars such that each of the car identifiers provides a unique identification to the associated one of the elevator cars and a plurality of location identifiers that are each situated in a selected location of the elevator system such that each location identifier provides a unique identification to the selected location, the method comprising:

indicating when one of the car identifiers is at the location of one of the location identifiers, the indication including an indication of the unique identification of the elevator car associated with the one of the car identifiers;

determining a location of the elevator car having the unique identification of a received indication based on the received indication and information regarding the unique identification of the location of the one of the location identifiers;

providing one or more parking areas where one or more of the plurality of elevator cars may be at least temporarily parked;

fixing at least one location identifier of the plurality of location identifiers at a location associated with each parking area;

fixing at least some of any remaining location identifiers of the plurality of location identifiers along transition zones for each hoistway of a plurality of hoistways associated with one or more of the plurality of elevator cars, wherein the transition zones accommodate elevator car movement between the plurality of hoistways; and determining locations of each elevator car for purposes of tracking whether each elevator car is in one of the parking areas, in one of the plurality of hoistways, or in one of the plurality of transition zones.

14. The method of claim 13, comprising obtaining, by one of the location identifiers, information from a nearby one of the car identifiers when the nearby one of the car identifiers is within a predetermined range of the location identifier, and wherein the indicating is performed by the one of the location identifiers, the indicating comprises providing an indication of the unique identification of the elevator car associated with the nearby one of the car identifiers, and the indication includes an indication of the unique identification of the selected location.

15. The method of claim 14, wherein each car identifier comprises a visible marking on the associated one of the elevator cars, and each location identifier comprises an optical device that is configured to detect the visible marking of each car identifier.

16. The method of claim 15, wherein the optical device comprises at least one of a reader, a camera, or a scanner; and the visible marking comprises at least one of an image, a character, a bar code, a QR code, a color, or a pattern.

17. The method of claim 14, wherein each car identifier comprises a signaling device that transmits a signal including an indication of the unique identification of the associated one of the elevator cars, and each location identifier comprises at least a receiver configured to receive the signal of the car identifiers when one of the car identifiers is within a predetermined range of the location identifier.

18. The method of claim 17, comprising using bi-directional communication between at least one of the car identifiers and at least one of the location identifiers, the bi-direction communication including indications of the corresponding unique identifications.

19. The method of claim 13, comprising obtaining, by one of the car identifiers, information from a nearby one of the location identifiers when the nearby one of the car identifiers is within a predetermined range of the location identifier, and wherein the indicating is performed by the one of the car identifiers, the indicating comprises providing an indication of the unique identification of the location of the nearby one of the location identifiers, and the indication includes an indication of the unique identification of the elevator car associated with the one of the car identifiers.

20. The method of claim 19, wherein the car identifiers are each configured to obtain information from another one of the car identifiers when the one of the car identifiers is within a predetermined range.

21. An elevator system, comprising:

a plurality of elevator cars;

a plurality of car identifiers, each of the car identifiers being associated with one of the elevator cars and providing a unique identification to the associated one of the elevator cars;

a plurality of location identifiers, each of the location identifiers being configured to be situated in a selected location of the elevator system and providing a unique identification to the selected location; and a controller that determines a location of each of the elevator cars based on at least one indication of the associated car identifier being at the location of a corresponding one of the location identifiers; and wherein:

one or more parking areas are provided where one or more of the plurality of elevator cars may be at least temporarily parked;

at least one location identifier of the plurality of location identifiers is fixed at a location associated with each parking area; and at least some of any remaining location identifiers of the plurality of location identifiers are fixed along each hoistway associated with one or more of the plurality of elevator cars.

* * * * *